Dec. 11, 1962 J. L. LAWRENCE ETAL 3,067,559

PACKAGE CASER

Filed Feb. 23, 1960 9 Sheets-Sheet 1

INVENTORS
JOSEPH L. LAWRENCE
FREDERICK J. LAWRENCE
BY
Allen and Chromy
ATTORNEYS Dec. 11, 1962 J. L. LAWRENCE ETAL 3,067,559

PACKAGE CASER

Filed Feb. 23, 1960 9 Sheets-Sheet 2

INVENTORS
JOSEPH L. LAWRENCE
FREDERICK J. LAWRENCE
BY
ATTORNEYS

Dec. 11, 1962 J. L. LAWRENCE ETAL 3,067,559

PACKAGE CASER

Filed Feb. 23, 1960 9 Sheets-Sheet 3

INVENTORS
JOSEPH L. LAWRENCE
FREDERICK J. LAWRENCE

BY Allen and Chromey

ATTORNEYS

PACKAGE CASER

Filed Feb. 23, 1960 9 Sheets-Sheet 4

INVENTORS
JOSEPH L. LAWRENCE
FREDERICK J. LAWRENCE
BY
Allen and Chromy
ATTORNEYS

PACKAGE CASER

Filed Feb. 23, 1960 9 Sheets-Sheet 5

INVENTORS
JOSEPH L. LAWRENCE
FREDERICK J. LAWRENCE
BY
Allen and Chromy
ATTORNEYS INVENTORS
JOSEPH L. LAWRENCE
FREDRICK J. LAWRENCE
BY
Allen and Allen
ATTORNEYS Dec. 11, 1962 J. L. LAWRENCE ETAL 3,067,559

PACKAGE CASER

Filed Feb. 23, 1960 9 Sheets-Sheet 7

INVENTOR.
JOSEPH L. LAWRENCE
FREDERICK J. LAWRENCE

BY Allen and Chromy.

ATTORNEYS

Dec. 11, 1962 J. L. LAWRENCE ETAL 3,067,559

PACKAGE CASER

Filed Feb. 23, 1960 9 Sheets-Sheet 8

INVENTORS
JOSEPH L. LAWRENCE
FREDERICK J. LAWRENCE

BY

Allen and Allen

ATTORNEYS

INVENTORS
JOSEPH L. LAWRENCE
FREDERICK J. LAWRENCE
BY
Allen and Chromy
ATTORNEYS

3,067,559
PACKAGE CASER

Joseph L. Lawrence, and Frederick J. Lawrence, San Francisco, Calif., assignors to King Sales & Engineering Co., San Francisco, Calif., a corporation of California Filed Feb. 23, 1960, Ser. No. 10,373
17 Claims. (Cl. 53—381)

The present invention relates to case packers, and it is concerned more particularly with a machine for automatically filling packages into a case as one or more layers, the work being performed automatically in response to the feed of cases and of packages to the machine.

It is a general object of the invention to provide an improved packer or case loading machine.

It is another object of the invention to provide a case loader for a relatively fragile package, which is capable of handling these packages as a layer in the casing operation.

It is a further object of the invention to provide a case packer in which the packages are assembled in case array in a storage or assembly hopper and then are transmitted to the case with an auxiliary movable feed hopper 8 assisting in control of the feeding operation.

A still further object of the invention is to provide a case packer where the feeding of the case with its flap open at one end is controlled in such a manner that the open flaps cannot interfere with the operation of registering the case with an opening through which the packages are fed thereto.

Another object of the invention is to provide a packer having a case supporting platform which is movable from active position to an inactive position where its mechanism is accessible for inspection and repair.

Still another object of the invention is to provide a case packer which attains the foregone objects and which also provides for a variation of the size of the case in which different size packages are to be placed, and for a variation in the number of layers which are inserted in each case.

Other objects and advantages in the invention will be apparent from the following description of a preferred embodiment of the invention, taken in connection with the accompanying drawings, in which.

Figure 3:
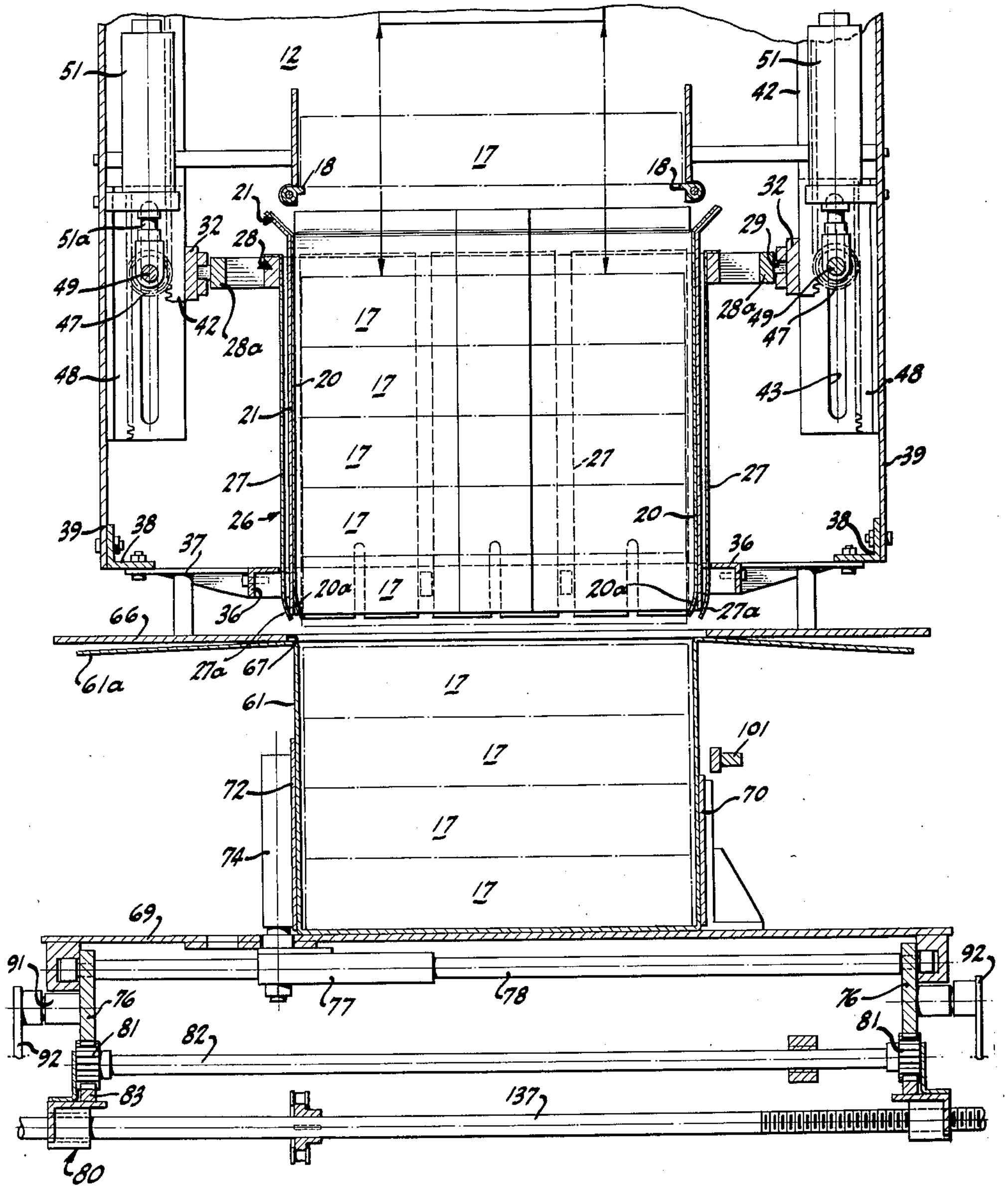
FIGURE 3 is an enlarged sectional view taken in a plane indicated by the line 3—3, in FIG. 1 certain parts being shown in dotted lines.

FIGURES 7, 8, 9, and 10 are schematic views similar generally to FIGURE 3 but illustrating the operation of the movable feed hopper as the packages are fed layer by layer through the stationary hopper assembly.

Figure 1:
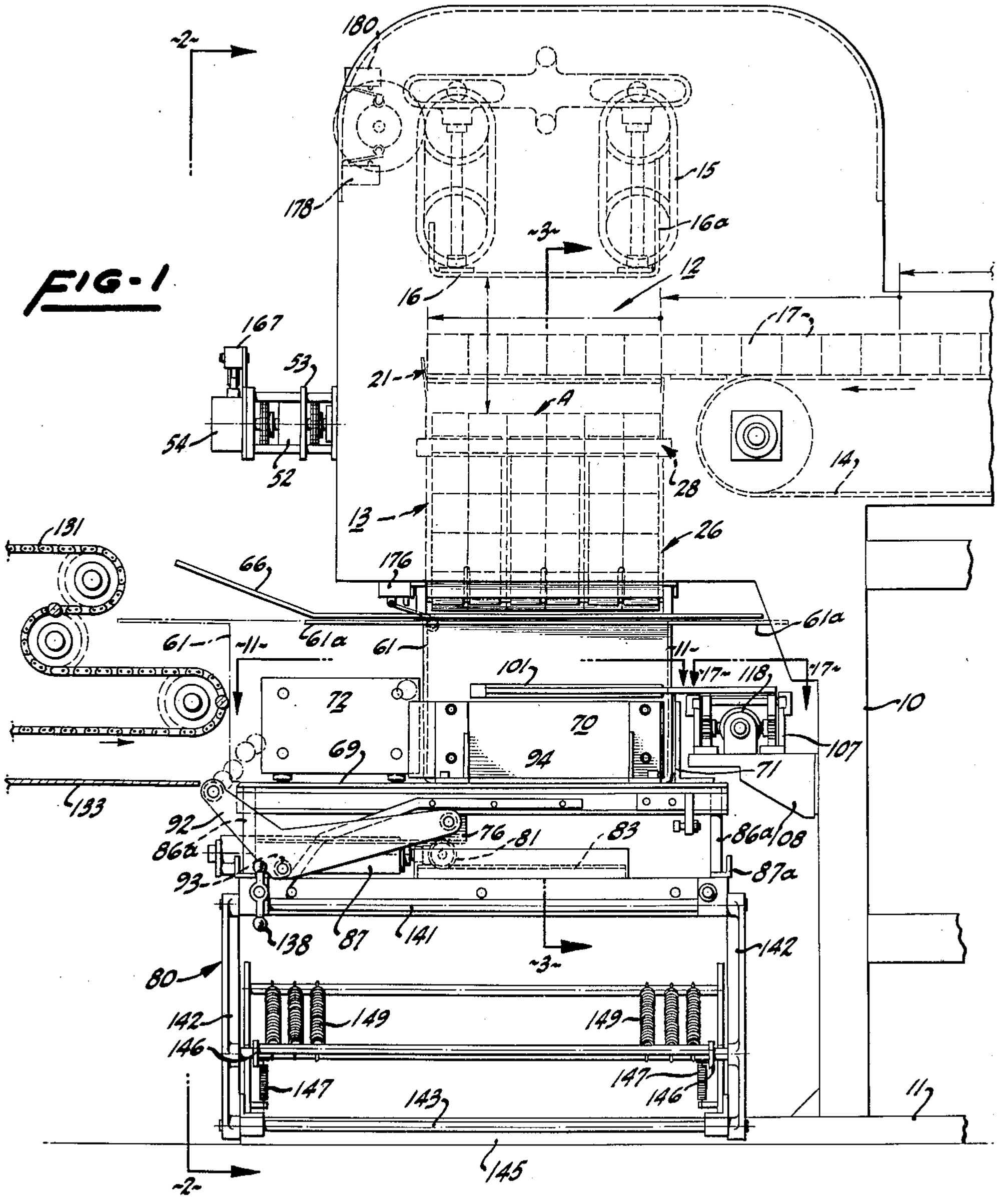
FIGURE 1 is a side elevational view of the apparatus with certain parts shown in dotted lines.
Figures 11, 12:
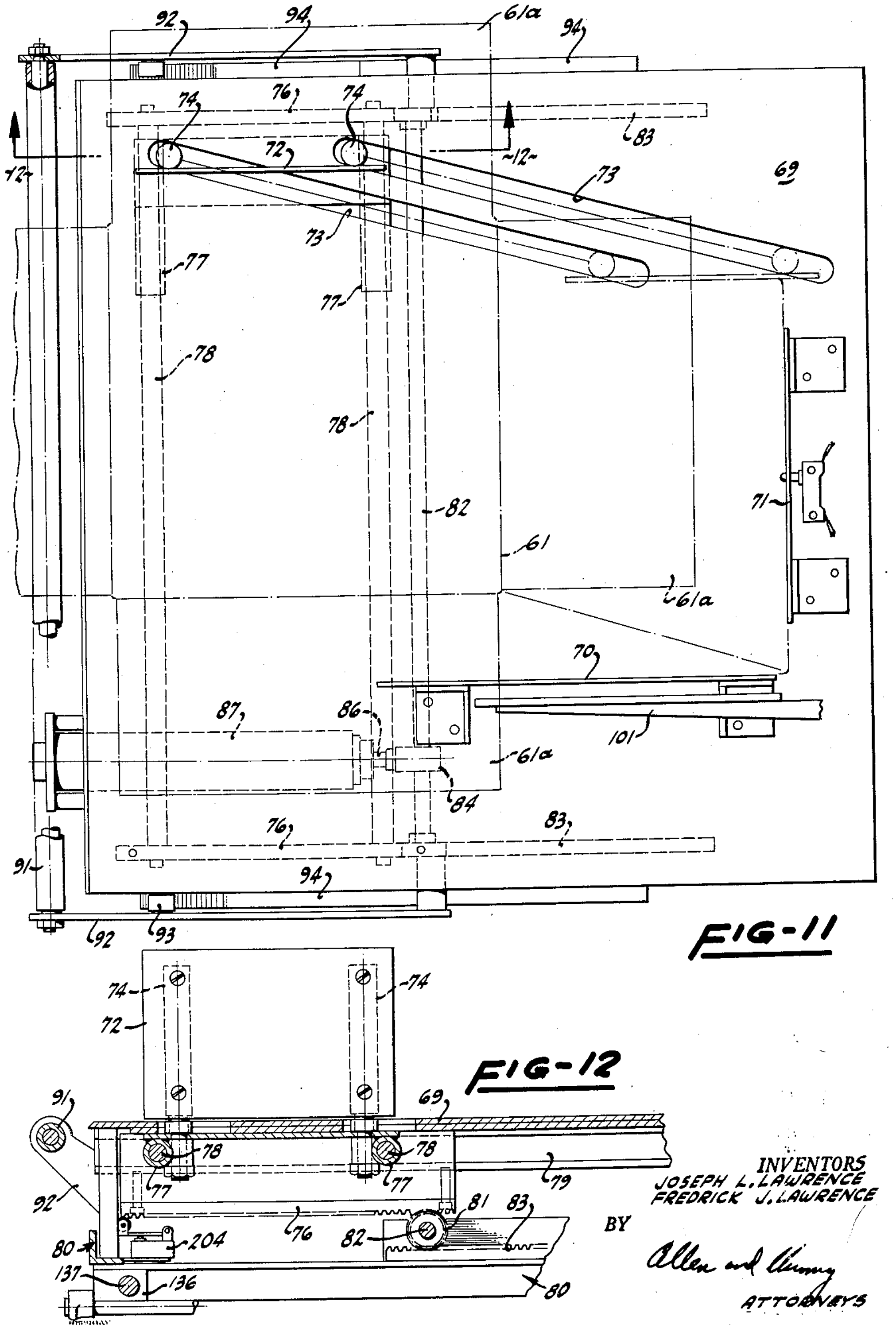

FIGURE 11 is a horizontal sectional view, partially in elevation, taken as indicated by the line 11—11 in FIGURE 1.

FIGURE 12 is a fragmentary sectional elevation taken as indicated by the line 12—12 in FIGURE 11.

Figure 2:
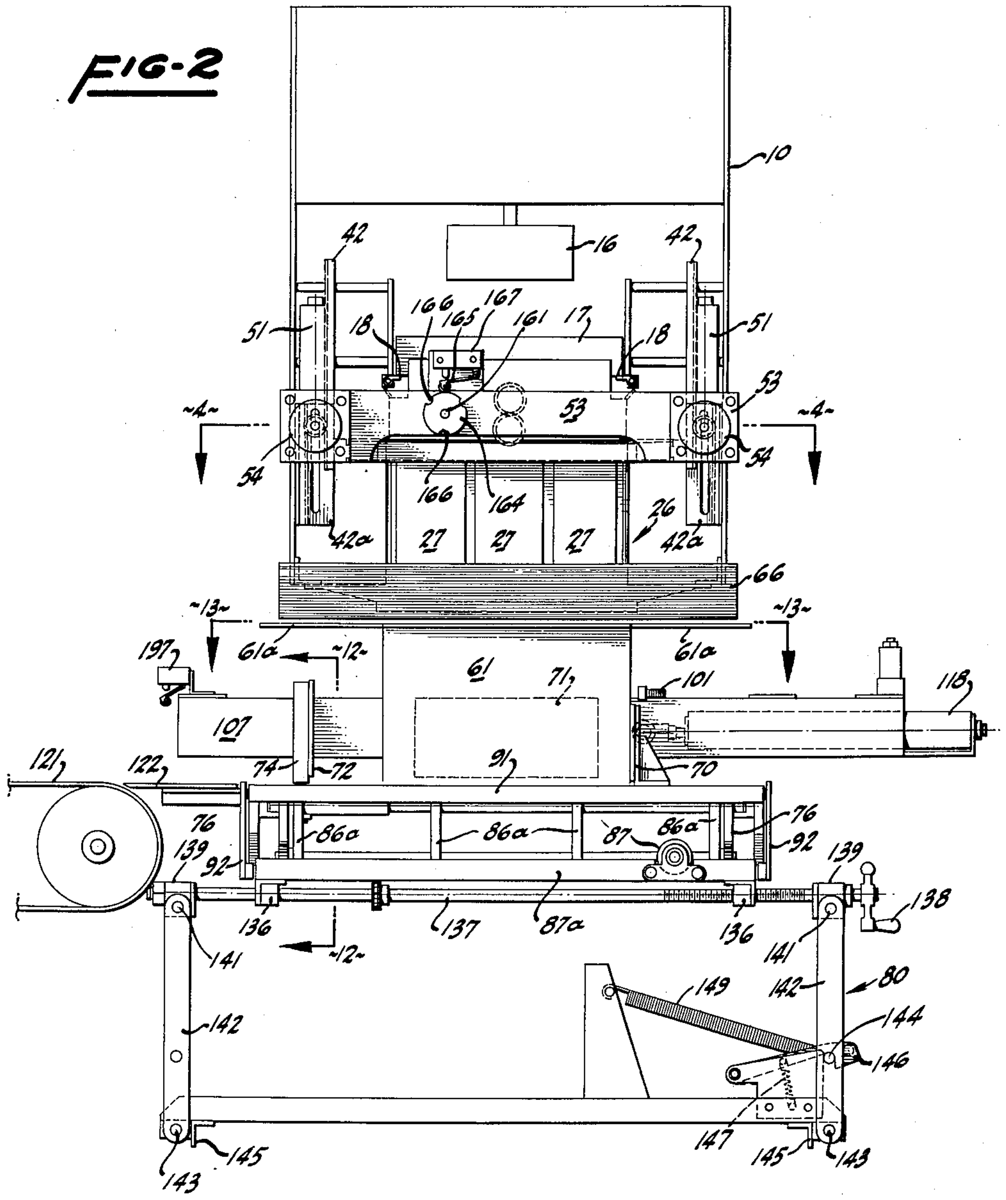
FIGURE 2 is an elevational view taken from the left of FIGURE 1 as illustrated by the line 2—2, with certain parts omitted for clarity of illustration.
Figure 13:
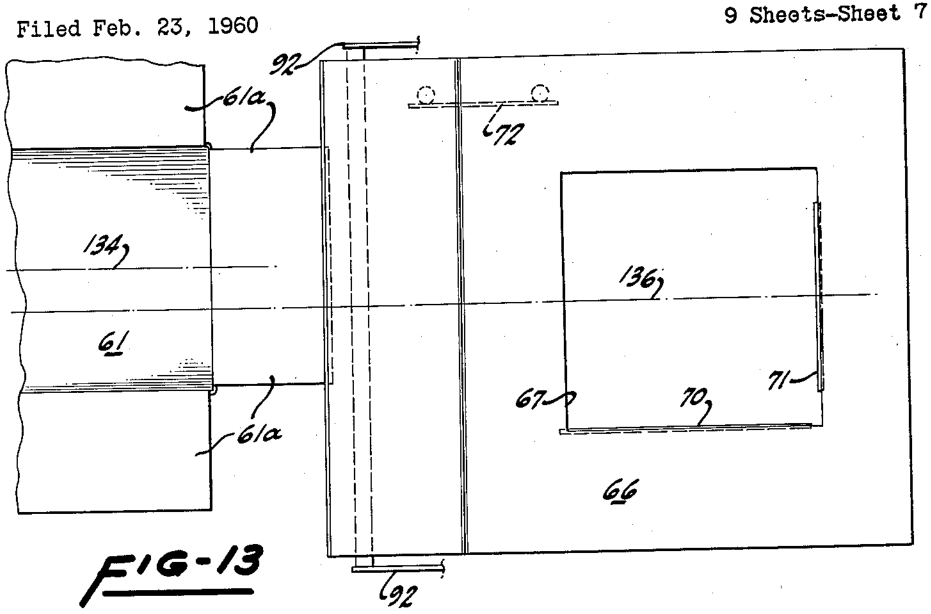

FIGURE 13 is a schematic plan view, with certain parts omitted, taken generally as indicated by the line 13—13 in FIGURE 2 and illustrating the operation of feeding the carton from the carton feed supply into the casing machine.

Figure 14:
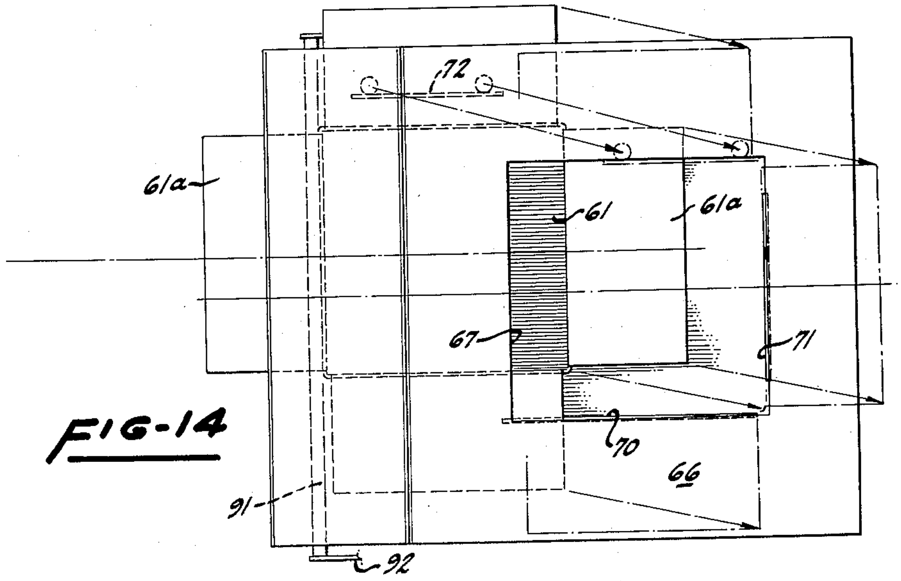

FIGURE 14 is a view similar to FIGURE 13 illustrating another stage in the feeding of a case into packaging receiving position.

Figure 15:
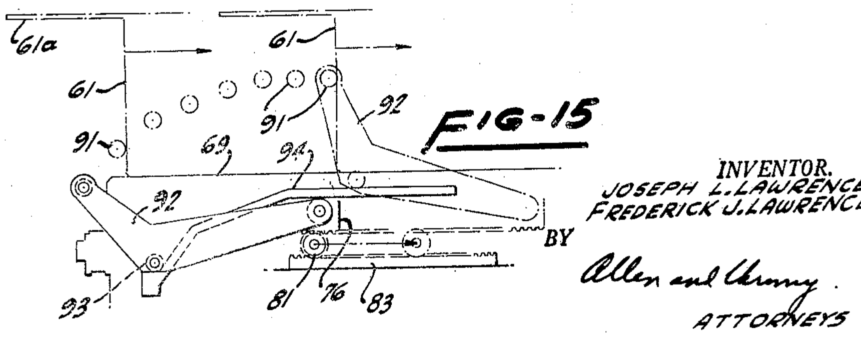

FIGURE 15 is an operational view similar to a portion of FIGURE 1, but illustrating the operation of the case propelling bar in moving a case from the case feeding mechanism into the casing machine.

Figure 16:
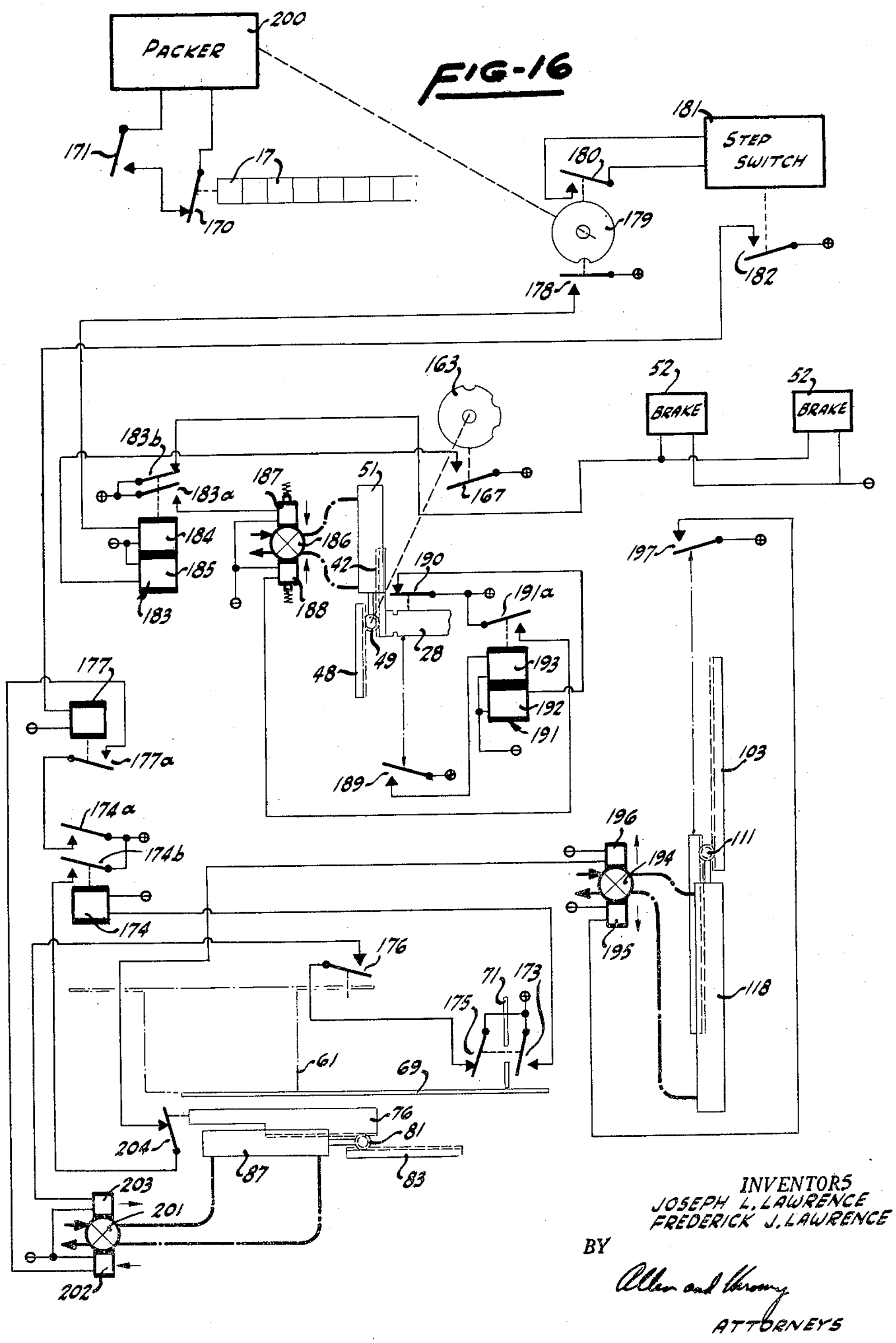

FIGURE 16 is a wiring diagram of the electrical apparatus.

Figures 17, 18:
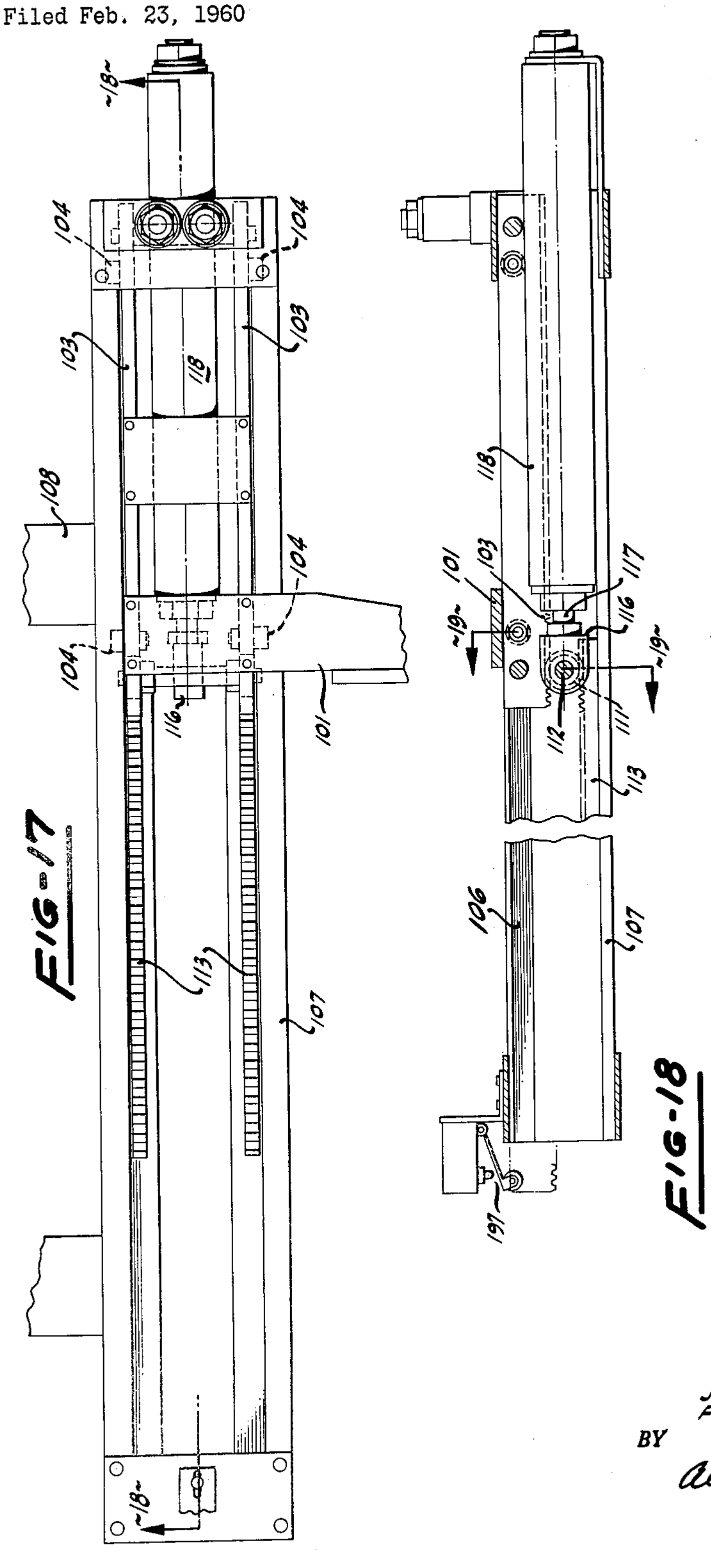

FIGURE 17 is the fragmentary plan view taken as indicated by the line 17—17 in FIGURE 1 and illustrating the full case discharging means.

FIGURE 18 is a sectional view partially in elevation taken as indicated by line 18—18 in FIGURE 17.

Figure 19:
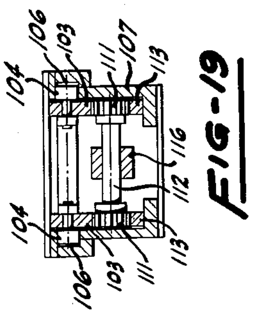

FIGURE 19 is a sectional view taken in planes indicated by the line 19—19 in FIGURE 18.

The machine includes a main frame 10 (FIGURE 1) extending upwardly from a base 11 and having in its upper part a package assembly station 12 to which packages 17 are fed as a layer by a feed conveyor 14. A casing station 13 is provided below the assembly station 12 and a layer of packages 17 is translated from the station 12 by a pusher 16 and its drive means 15 to the station 13. The pusher 16 and its drive means 15 are conventional and are of the type shown in the copending application of Lawrence et al. Serial No. 671,488, filed July 12, 1957, now U.S. Patent No. 3,014,599. The packages 17 are supported at the layer assembly station 12 by a pair of spring-urged yieldable gates 18 (FIGURE 3) which are also disclosed in detail in said application.

It will be understood in general that the operation of the pusher 16, after a layer of packages is assembled at the package assembly station, serves to translate these packages downwardly to a position indicated generally at A (FIGURE 1). The packages 17 which remain on the conveyor 14 are restrained by a portion 16*a* of the pusher 16, all as described in said application.

The layer of cartons 17 at position A (FIGURES 1 and 3) enter a stationary hopper 21 (FIGURE 3) which is of rectangular construction and has angled guide-in flanges 21*a* at the top. The hopper 21 is provided with four walls 20 of resilient construction so that the packages are retained therein. The lower edge 20*a* of each wall 20 is bent inwardly for yieldable package retaining operation.

Figure 5:
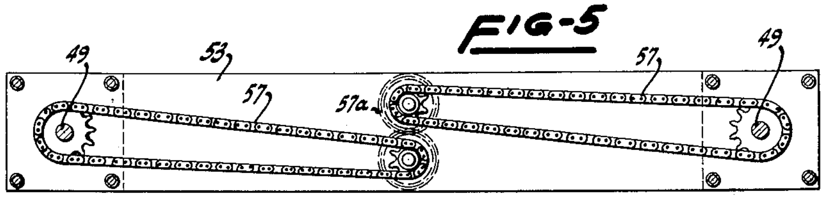
FIGURE 5 is a sectional elevational view taken in a plane indicated by the line 5—5 in FIGURE 4.
Figure 6:
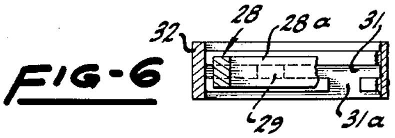
FIGURE 6 is a fragmentary elevational view partially in section taken as indicated by the line 6—6 in FIGURE 4.

Encompassing the stationary hopper 21 is an auxiliary movable feed hopper 26 (FIGURES 2, 3, and 5) composed of a plurality of flexible resilient strips 27, disposed vertically and having inturned curved guide edges 27*a* at the bottom. These strips 27 are carried at their upper edges by a rectangular hopper frame 28 (FIGURES 2, 3, and 4) and this hopper frame 28 has a pair of opposite side bars 28*a* carrying four blocks 29 projecting outwardly and received in opposite channels 31 of a vertically reciprocable carriage 32. Each channel 31 (FIGURES 4 and 6) has its lower flange notched at 31*a* at a plurality of places to allow insertion of the blocks 31 upwardly to register with the channel of the channel member and then displacement laterally to be held in place in the channels 31.

The spaced notches 31*a* enable free removal of the hopper by correct positioning of the blocks 29 with respect to the notches 31*a*. The hopper is inserted from the bottom and through the notches, and then it is moved laterally to a position where it is held as later described. This construction also provides for use of different hoppers for different sizes of cases.

The lower end of the movable hopper 26 (FIGURES 3 and 4) is received and guided by a rectangular angle frame 36 which has four extending brackets 37 secured by bolts 41 to respective angles 38 carried by the side walls 39 of the frame. By removing the bolts 41, this rectangular frame 36 can be removed, and then the hopper can be detached and removed so that a change of size can be made when desirable. Each size of hopper is provided with similar size of a detachable rectangular frame 36 for its guiding during its vertical movement.

The hopper frame 23 (FIGURES 3, 4, and 5) is carried for vertical step-by-step movement, each mounting channel 31 therefor being attached to two vertical rack members 32 and being guided by vertically extending frame angles 42*a*. Each movable rack member 42, associated with the movable hopper 26, as shown in FIGURE 3, meshes with a pinion 47 which is carried by a horizontally extending shaft 49, each shaft 49 carrying a pinion 47 at its end, and being guided in respective vertical slots 43 in the frame angles 42*a*. Each pinion 47 also meshes with a vertically extending stationary rack 48 carried by a frame plate 39, and the shaft 49 is connected to the piston rod 51*a* of an air cylinder 51 secured on the frame. The shafts 49 (FIGURE 3) are guided in vertically extending slots 43 of frame angles 42*a*.

Figure 4:
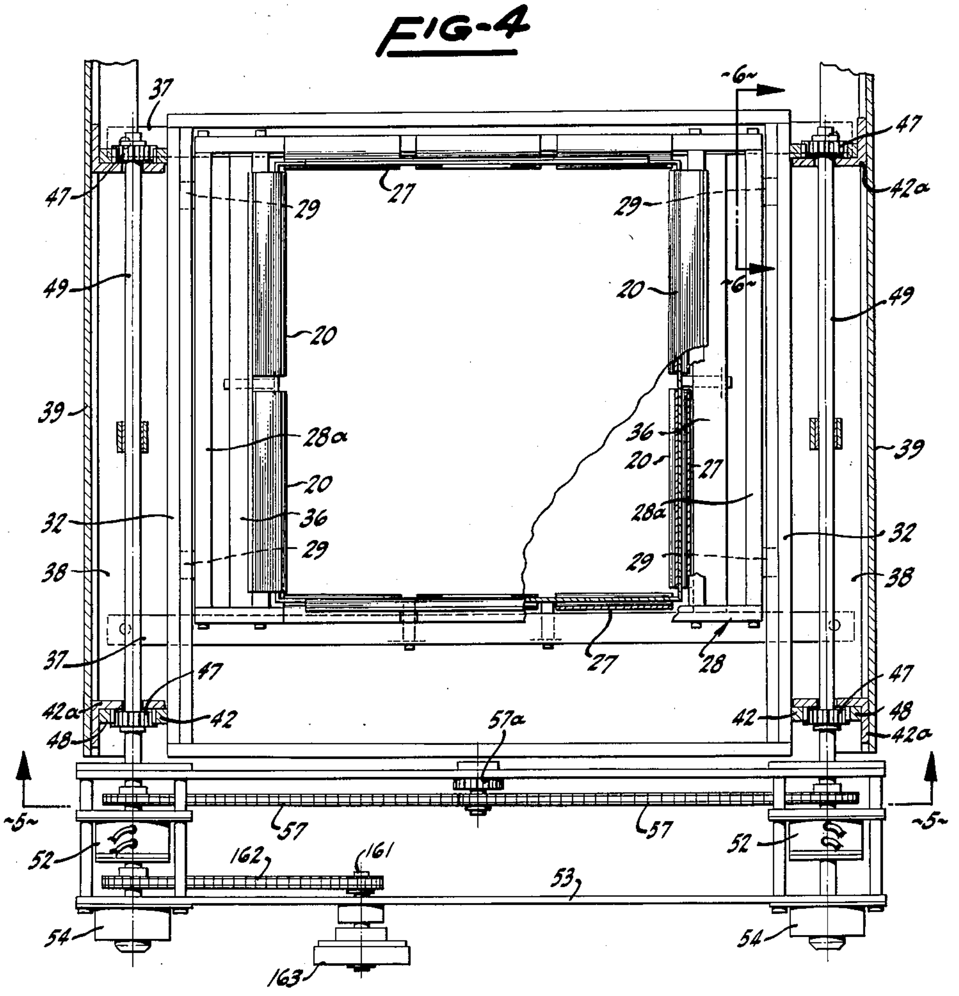
FIGURE 4 is a horizontal sectional view taken in a plane indicated by the line 4—4 in FIGURE 2.

The two shafts 49 (FIGURE 5) are interconnected by means of respective chain and sprocket mechanisms 57 and gearing 57*a* so that their movement will be uniform and the frame will be maintained in parallel motion. Conventional electric brake mechanisms 52 are associated with the respective shafts 49 and control the step-by-step movement as will be described later. These brake mechanisms are suitably mounted on an auxiliary framework 53 which is mounted for movement with the carriage 32 so that the chain and sprocket mechanisms 57 and the gearing 57*a* also travel vertically with the carriage 32, and the hopper 26. Suitable conventional spring counterbalances 54 are carried at the end of each shaft 49 as seen in FIGURE 4.

Associated with the rotation of the shaft 49 is a control means for stopping the movable hopper 26 after each step of movement of the hopper carriage on frame 32. For this purpose the auxiliary frame 53 (FIGURES 2 and 4) carries a shaft 161, which is driven by chain and sprocket mechanism 162 from one of the shafts 49. This shaft 161 carries at its outer end a rotatable cam member 163 which has a plurality of raised portions 164 separated by notches 166 and engaged by a cam follower 165. When the follower 165 is on a raised portion 164 a switch 167 is opened, and when it is registering with one of the notches 166 the switch is closed.

For the present purpose it is sufficient to understand that a horizontal layer of packages is translated downwardly upon each stroke of the pusher 16 (FIGURE 1), the gates 18 yielding to permit passage of the layer of cartons from the assembly station 12, the layers being introduced successively into the stationary hopper 21 until the desired number of layers is accumulated therein, each layer serving to push the preceding layer ahead.

Figure 7:
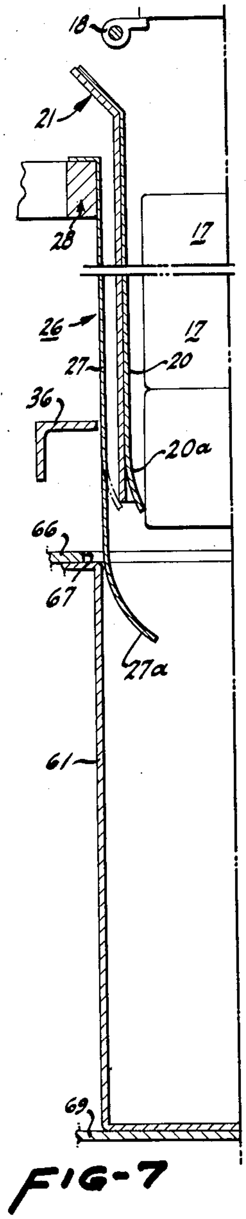
Figure 8:
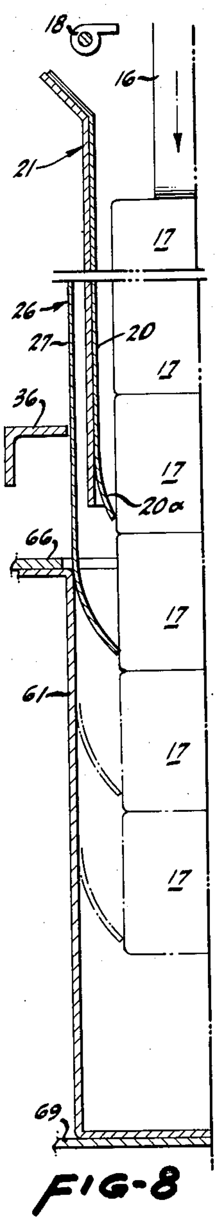
Figure 9:
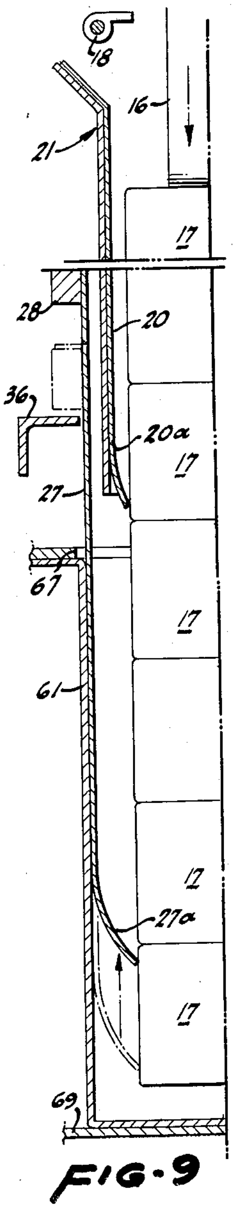
Figure 10:
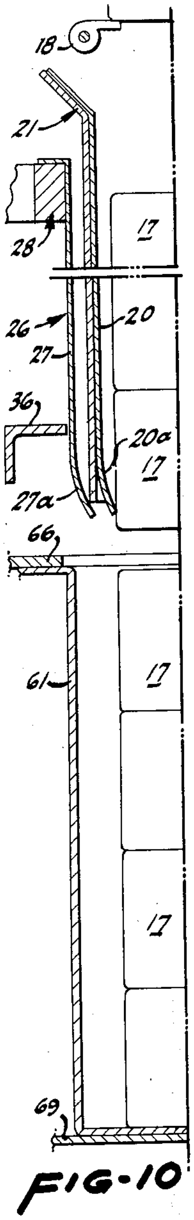

Assuming that the auxiliary hopper 21 is full of packages, and the condition of the parts is as shown in FIGURE 7, it will be noted that the flexible strips 20 have their ends 20*a* disposed below the lowermost layer of packages 17. The strips 27 enter into and span the gap between these packages and the case 61 which is disposed below the case-retaining plate 66, in registry with the aperture 67 therein. Thus each step of movement of the packages, will be accompanied by a step of the flexible strips 27 and the auxiliary hopper 26 and the ends 27*a* of the flexible strips 27 always will be disposed in retaining relation with the lowermost layer of cartons 17 as shown in FIGURES 8 and 9 for example to retain the stacked relation of the layers of cartons as they are entering the case 61. In FIGURES 7 through 10, the space between the cartons and the case has been exaggerated to simplify the illustration of the parts. The auxiliary hopper 26 always moves with the packages 17 until the last step of movement and then is automatically retracted, as later described.

A case-supporting table 69 (FIGURES 1, 2, and 11) is provided having a pair of fixed case-stopping plates 70 and 71 secured thereon at right angles to each other. Opposite the plate 70, a movable case-positioning plate 72 is mounted for diagonal movement along a path defined by a pair of inclined slots 73 in the table 69 by a pair of posts 74 (FIGURES 11 and 12) carrying rollers engaging in these slots. Thus the plate 72 moves from the left of FIGURE 11 toward the right to its dotted line position and also approaches the parallel plate 70 during its travel, so that it will seat a case disposed between itself and the plate 70 securely against the plate 70.

Vertical posts 74 (FIGURES 3 and 12) are carried by a pair of sleeves 77 which slide on transverse rods 78 extending underneath the table 69 and secured between opposite racks 76 movably mounted in respective tracks 79 of the table-supporting frame 80. The racks 76 have gear teeth at the lower edges meshing with a pair of pinions 81 carried by a common shaft 82, and also meshing with a stationary rack 83 on the frame 80. As seen in FIGURES 1 and 11, the shaft 82 is connected by a fitting 84 to the piston rod 86 of an air cylinder 87, so that as the air cylinder is operated, and the shaft 84 is moved to the right as seen in FIGURE 11, the plate 72 will be positively translated to the right for the full, with the sleeve 77 carrying the plate 72 being slid along the rods 78.

A case feed bar 91 (FIGURES 1, 11 and 12) is pivotally secured respectively to the ends of a pair of bell-crank arms 92 which at their opposite ends are pivotally mounted on the respective racks 76. Intermediate the ends of the arms 92, they carry respective rollers 93 (FIGURES 1 and 15) engaged with inclined cam tracks 94 and normally being in lower position for passage of a case thereover. When the bar 91 is moved rearwardly, it is first raised to active position to engage a case and then carries it into position against plate 71 to receive packages.

A case-ejecting arm 101 (FIGURES 1, 11 and 17) is provided for moving a case 61 off of the table 69 when it is filled, and this arm is carried by a pair of racks 103 which carry respective rollers 104 engaging and traveling in respective opposite guide grooves 106 of an auxiliary ejecting frame 107 carried by a bracket 108 on the frame 10. Each rack 103 meshes with a traveling pinion 111 carried at the ends of a shaft 112 and also meshing with respective fixed racks 113 (FIGURE 19) carried by the auxiliary frame 107. The shaft 112 is connected by fitting 116 (FIGURES 17 through 19) with the piston rod 117 of an air cylinder 118 suitably mounted on the frame 107.

Thus when the air cylinder 118 is operated to move its piston rod to the left as shown in FIGURE 2, the ejector arm 101 engages the case 61 and moves it across a suitable dead plate 122 onto a discharge conveyor 121.

Means is provided for feeding a case to the machine with the case open at the top and with its flaps extended at the top and held in a horizontal position. Any suitable means can be provided for this purpose or if desired the cases can be inserted manually. As shown the means selected for illustration in FIGURE 1 include a conveyor 131 from which cartons 61 are fed from the conveyor plate 133 into position between the plate 66 and the table 69. As shown in FIGURE 13, the center line 134 of feed of a case is offset from the center line 136 of its position for receiving packages, and the normal inactive position of the movable positioning plate 72 on the table 69 is to one side of the feed path of a case so that the case will be picked up by the plate 72, and the feed bar or roller 91, and moved along a diagonal path to coincide with the opening 67 in the plate 66 through which the packages are fed to the case.

By virtue of a positioning of the movable plate 72 in offset relation to the opening 67 of the upper plate 66, a case 61 can be placed on the table 69, have its opened flaps positioned beneath the plate 66 and none of the outturned flaps will, at this time, be aligned with the opening 67. By providing a diagonal line of movement over the table 69, as seen in FIGURE 14, the open case 61 with its flaps 61a turned out moves into position for filling without it being possible for any of the flaps to become engaged accidentally within the opening 67. As seen in FIGURE 14 the leading flap 61a of the case 61 is never totally aligned with the opening 67.

The table 69 (FIGURES 1, 2 and 3) is carried by a series of posts 86a of a rectangular angle frame 87a having respective pairs of nuts 136 engaged with a threaded screw 137, which by means of handle 138 can move the table 69 laterally to accommodate different case sizes, a change in the spacing of the fixed plates 70 and 71 also being made to accommodate this change in size.

Means is provided for moving the table to and from active position, the movement away from active position also placing it in accessible position for operation thereon in making repairs or adjustments, and for providing access to the hopper mechanism disposed above. The threaded shafts 137 (FIGURES 1 and 2) are journaled in suitable bearings 139 which are pivotally mounted at 141 in respective sets of upright arms 142 pivotally supported at 143 on a base 145. One of the arms 142 has a pin 144 normally engaged by a latch 146 under the urgency of a latch spring 147, so that the table is maintained in its upper position. When it is desired to inspect the table, to adapt it to different case sizes, or to make any repairs, the latch 146 can be disengaged, and the arms 142 swung against the tension of the springs 149 so that the table is lowered and moved outwardly to one side to be available for the work.

Referring to FIGURE 16 which shows the wiring diagram of this apparatus the portion at the top of this diagram including the packer 200 and the stepping switch 181 are disclosed in said prior application and will therefore be described only briefly herein. The packer 200 includes a switch 170 which is actuated when the package layer 17 is full so that the switch 170 associated with the packer is closed. Switch 171 which is connected in series with the switch 170, is arranged to be closed when a case 61 is positioned on the table 69 adjacent to the wall 71. In this position the case 61 is also instrumental in closing switch 173 and opening switch 175. Thus the packer 200 is not operative unless a case 61 is in place on the table 69 thereby closing switch 171, switch 173 and opening switch 175.

When the case 61 is placed on the table 69 it functions to close the switch 176 which is connected to the solenoid 203 of solenoid valve 201 and energizing this solenoid operates this valve to supply fluid pressure to the left hand end of the cylinder 87 thereby moving the pinion 81 and rack 76 to the right causing movement of the case propelling bar 91 to shove the case home to the right between the plates 70 and 71 shown in FIGURE 11. Plate 71 is schematically shown in the wiring diagram (FIGURE 16) as located between the switches 173 and 175 which are mechanically coupled so that when the case is shifted to the right switch 175 is open and switch 173 is closed. Opening switch 175 which is in series with switch 176 and which is also connected to the solenoid 203 causes interruption of the energization of this solenoid when the case 61 has been shifted to the right.

Switch 173 is connected in series with switch 171 and closing these switches causes the packer 200 to start operation so that one layer 17 of the packages is pushed downward from the position shown in FIGURE 7 to its position shown in FIGURE 8 thereby opening switch 170 since the layer of packages 17 closing this switch was moved downward.

The packer 200 is mechanically connected to a rotatable cam 179 which is provided with a switch actuating notch on the periphery thereof so that this cam actuates the switches 178 and 180 once during each revolution. The switch 180 is connected to the stepping switch 181 and triggers this switch once for each revolution of the cam 179. The stepping switch 181 is preset for the number of layers 17 that are to be placed into a case. Thus each time the packer 200 supplies a layer of packages 17 the stepping switch 181 is triggered and after this stepping switch is triggered the predetermined number of times it functions to close the switch 182 which is mechanically associated therewith.

Each time the cam 179 closes the switch 178 the latching solenoid 184 of relay 183 is energized to close the switch 183a and open the switch 183b thereof. Closing of the switch 183a closes the circuit of solenoid 187 of solenoid valve 186 so that the valve 186 supplies fluid pressure to the cylinder 51 causing this cylinder to advance one step. The cam 163 is mechanically connected to the shaft 49 associated with the cylinder 51 so that this cam 163, which is provided with a plurality of notches, is advanced one step and closes switch 167 which is connected to the unlatching solenoid 185 of the relay 183 thereby causing this relay to open the switch 183a and close switch 183b. Switch 183b is connected to the braking system 52 which is employed to hold the shaft 49 in predetermined positions.

At the end of the predetermined number of steps of actuation of the shaft 49 the switch 189 is closed by the hopper carriage 28. Closing switch 189 causes energization of the latching winding 193 of relay 191 and this relay then functions to close the switch 191a associated therewith and this closes the circuit to the solenoid 188 of valve 186 which is adjusted to allow fluid pressure to come into the lower end of the cylinder 51 thereby retracting the piston thereof and moving the movable hopper carriage 28 to its upper position in which it closes the switch 190. This switch is connected to the winding 192 of the relay 191 and closing it causes energization of this winding so that the relay is unlatched and switch 191a is opened.

Also, when the stepping switch 181 arrives at its predetermined number of counts the switch 182 is closed and this causes energization of the relay 177 which functions to close the switch 177a associated therewith. Relay 174 was previously energized by the closing of switch 173 by the case 61 so that switches 174a and 174b were closed and closing of switch 182 causes energization of the solenoid 196 of solenoid valve 194. Switch 204 is also closed when relay 177 is energized since solenoid 202 is energized to return the rack 76 to its leftmost position. Energizing of solenoid 196 of the valve 194 causes fluid pressure to be supplied to the lower end of the cylinder 118 so that the rack 103 is shifted upward and this carries the arm 101, shown in FIGURE 11 which ejects the case 61, outward. The switch 197 is closed when the rack 103 is moved upward and closing this switch causes energization of the solenoid 195 of valve 194 which supplies fluid pressure to the top of the cylinder 118 and causes retraction of the rack 103 and ejector arm. This operation completes the cycle.

While we have shown and described a preferred embodiment of the invention, it will be apparent that the invention is capable of variation and modification of the form shown so that the scope thereof should be limited only by the scope of the claims appended hereto.

We claim:

1. In a package caser, means for forming a layer of packages in horizontally disposed layer array at a layer forming station, a first hopper vertically aligned with said station for forming a case array of packages layer by layer, means for advancing each layer vertically from the layer-forming station into the hopper, means disposed below said hopper for supporting a case positioned in operative relation to said hopper to receive the case array of packages therefrom, an auxiliary hopper encompassing said first hopper, and means for advancing said auxiliary hopper step-by-step downwardly into the case as the packages are fed therein, said auxiliary hopper having means to engage the lowermost layer of packages to maintain the position thereof during feeding into the case.

2. In a package caser, means for holding a case array of packages, said array defining a cross-sectional area extending in one direction and defined by a plurality of packages, means for supporting a case in operative relation below said array holding means to receive the case array of packages therefrom, said case having an open end with a cross-sectional area corresponding to and parallel to said cross-sectional area of said array, a hopper encompassing said array holding means and means for advancing said hopper downwardly into the case as the packages are fed therein, said hopper having vertically extending means to engage the packages to maintain the array thereof during feeding into the case.

3. In a package caser, means for forming a layer of packages in horizontally disposed layer array at a layer forming station, a first hopper aligned with and disposed below said station for forming a case array of packages, said array defining a cross-sectional area extending in one direction and defined by a plurality of packages, means for advancing each layer from the layer-forming station downwardly into the hopper, means for supporting a case in operative relation to and below said hopper to receive the case array of packages therefrom, said case having an open end with a cross-sectional area corresponding to and parallel to said cross-sectional area of said array, said hopper including flexible guide means for spanning the vertical gap between said hopper and a case on said supporting means, an auxiliary hopper encompassing said first hopper, and means for advancing said auxiliary hopper downwardly into the case as the packages are fed therein, said auxiliary hopper having vertically extending means to engage the packages to maintain the array thereof during feeding into the case.

4. In a package caser, means for forming a layer of packages in horizontally disposed layer array at a layer forming station, a hopper aligned with and disposed below said station for forming a case array of packages, said array defining a cross-sectional area extending in one direction and defined by a plurality of packages, means for advancing each layer from the layer forming station downwardly into the hopper, means for supporting a case in operative relation to and below said hopper to receive the case array of packages therefrom, said case having an open end with a cross-sectional area corresponding to and parallel to said cross-sectional area of said array, an auxiliary hopper encompassing said first hopper, and means for advancing said auxiliary hopper downwardly into the case as the packages are fed therein, said auxiliary hopper having vertically extending means to engage the packages to maintain the array thereof during feeding into the case.

5. In a case packer as recited in claim 4 in which said package-engaging means of said auxiliary hopper includes a plurality of flexible package engaging fingers for engaging the packages entering a case.

6. In a package caser as recited in claim 4 including means operated by the auxiliary hopper for effecting withdrawal of said hopper after the packages are fed into the case.

7. In a package caser as recited in claim 6 including means for effecting discharge of a case after withdrawal of said hopper.

8. In a package caser, a main frame, means for forming a layer of packages in a horizontally disposed layer array at a layer forming station, said array defining a cross-sectional area in one direction and defined by a plurality of packages, a first hopper aligned with and disposed below said station for forming a case array of packages layer by layer, means for advancing each layer downwardly from the layer forming station into the hopper, said case having an open end with a cross-sectional area corresponding to and parallel to said cross-sectional area of said array, means for supporting a case in operative relation to and below said hopper to receive the case array of packages therefrom, an auxiliary frame movably mounted on said main frame, an auxiliary hopper encompassing said first hopper and detachably mounted on said auxiliary frame, and means for advancing said auxiliary frame and hopper downwardly to project said auxiliary hopper into the case as the packages are fed therein, said auxiliary hopper having vertically extending means to engage the packages to maintain the position thereof during feeding into the case.

9. In a package caser, means for forming a layer of packages in layer array at a layer forming station, said array defining a cross-sectional area in one direction and defined by a plurality of packages, a first hopper aligned with said station for forming a case array of packages layer by layer, means for advancing each layer from the layer-forming station into the hopper, said case having an open end with a cross-sectional area corresponding to and parallel to said cross-sectional area of said array, means for supporting a case in operative relation to said hopper to receive the case array of packages therefrom, an auxiliary hopper encompassing said first hopper, means for advancing said auxiliary hopper step-by-step into the case as the packages are fed therein, and means for presetting the number of steps of advance of said auxiliary hopper during feeding into the case.

10. In a package caser including a case support and a stationary flap-holding plate spaced thereabove having a rectangular opening through which packages are fed to a case on said support, said case support being positioned below said opening a distance at least as great as the height of a sidewall of said case and less than the combined dimension of a sidewall and a flap attached thereto, and means for feeding a case into registry with said opening including means for feeding said case diagonally of the sides of said opening and into registry with said opening, whereby the open flaps of said case have no opportunity to project through said opening.

11. In a package caser including a case support, means spaced thereabove defining a rectangular opening through which packages are fed to a case on said support, said case support being positioned below said opening a distance at least as great as the height of a sidewall of said case and less than the combined dimension of a sidewall in a flap attached thereto, and means for feeding a case diagonally of the sides of said opening and into registry with said opening, comprising two feed members movable at an angle to each other.

12. In a package caser as recited in claim 11, in which one of said feed members is mounted for movement on the other of said feed members.

13. In a package caser as recited in claim 12, in which said support has means for controlling the movement of said one member.

14. In a package caser, means for forming a case array of packages, means for effecting entry of said array into a case, means for feeding a case into position to receive the case array, reciprocating means for feeding the filled case from said position after filling thereof having a normal inactive position, and means for operating said last named means in response to the completion of fill of the case to move away from and back to said normal position.

15. In a case packer, the method of preventing undesired upward movement of the open flap of a case through a rectangular opening with respect to which the case is to be aligned, which comprises positioning the case in offset alignment with respect to the opening, then effecting diagonal movement of the case toward the opening to effect registry therewith, and holding the flaps in an open position both during said diagonal movement and with the can at rest and in alignment with said opening.

16. In a package caser, means for forming a layer of packages in layer array at a layer forming station, a plate located below said layer forming station and having a rectangular opening through which packages may be fed, a case support below said opening for supporting a case in position to receive packages from said assembly station, said case support being positioned below said opening a distance at least as great as the height of a sidewall of said case and less than the combined dimension of a sidewall and the flap attached thereto, means for feeding a case diagonally of the sides of said opening and into registry with said opening whereby the open flaps of said case have no opportunity to project through said opening, a first hopper disposed between and aligned with said station and said opening for forming a case array of packages layer by layer, means for advancing each layer from the layer forming station into the hopper, an auxiliary hopper encompassing said first hopper and means for advancing said auxiliary hopper through said opening step-by-step into the case as the packages are fed therein, and means for feeding a filled case from said support after filling thereof, and means for operating said last named means in response to completion of fill of the case.

17. In a package caser, means for forming a layer of packages in layer array at a layer forming station, a plate located below said layer forming station and having a rectangular opening through which packages may be fed, a case support below said opening for supporting a case in position to receive packages from said assembly station, said case support being positioned below said opening a distance at least as great as the height of a sidewall of said case and less than the combined dimension of a sidewall and the flap attached thereto, means for feeding a case diagonally of the sides of said opening and into registry with said opening whereby the open flaps of said case have no opportunity to project through said opening, a first hopper disposed between and aligned with said station and said opening for forming a case array of packages layer by layer, means for advancing each layer from the layer forming station into the hopper, and an auxiliary hopper encompassing said first hopper and means for advancing said auxiliary hopper through said opening step-by-step into the case as the packages are fed therein.

References Cited in the file of this patent

UNITED STATES PATENTS

| | | |
|---|---|---|
| 684,737 | Wyckoff | Oct. 15, 1901 |
| 1,045,391 | Graf | Nov. 26, 1912 |
| 1,445,431 | De Vries | Feb. 13, 1923 |
| 1,555,225 | McKaig | Sept. 29, 1925 |
| 1,588,156 | Anderson | June 8, 1926 |
| 1,592,767 | House | July 13, 1926 |
| 1,874,669 | Wagner | Aug. 30, 1932 |
| 2,291,645 | Nordquist | Aug. 4, 1942 |
| 2,575,580 | Cadmus | Nov. 20, 1951 |
| 2,780,900 | Monroe et al. | Feb. 12, 1957 |
| 2,808,693 | Guggenheim | Oct. 8, 1957 |
| 2,825,191 | Batchelder | Mar. 4, 1958 |
| 2,898,715 | Cella | Aug. 11, 1959 |
| 2,909,016 | Sherrill | Oct. 20, 1959 |